United States Patent [19]

Molina

[11] 4,432,680

[45] Feb. 21, 1984

[54] STRESSED PANEL FASTENER

[75] Inventor: Jorge W. Molina, Torrance, Calif.

[73] Assignee: Deutsch Fastener Corp., El Segundo, Calif.

[21] Appl. No.: 278,634

[22] Filed: Jun. 29, 1981

Related U.S. Application Data

[63] Continuation-in-part of Ser. No. 236,859, Feb. 23, 1981, abandoned.

[51] Int. Cl.³ .................... E04B 1/48; F16B 13/04; F16B 37/04; F16B 39/00
[52] U.S. Cl. .................... 411/103; 411/105; 411/316; 411/352
[58] Field of Search ............. 411/103, 105, 112, 316, 411/317, 352

[56] References Cited

U.S. PATENT DOCUMENTS

| | | | |
|---|---|---|---|
| 3,141,487 | 7/1964 | Boyd | 411/105 |
| 3,219,088 | 11/1965 | Zahodiakin | 411/103 |
| 3,295,578 | 1/1967 | Maloof | 411/105 |
| 3,730,243 | 5/1973 | Smith | 411/105 |
| 3,863,421 | 2/1975 | Busch et al. | 411/517 X |
| 4,016,914 | 4/1977 | Zurko | 411/105 |
| 4,285,380 | 8/1981 | Gulistan | 411/103 |

OTHER PUBLICATIONS

"Mark IV Fastener Drawings" of Tridair Industries Drawing CAL-STD-0091, sheets 1, 5, 6 and 7.

Primary Examiner—Wayne L. Shedd
Attorney, Agent, or Firm—Gausewitz, Carr, Rothenberg & Edwards

[57] ABSTRACT

This invention provides a shear resistant panel fastener that includes a bolt having a head and a shank with a first relatively large diameter portion adjacent the head and a second smaller diameter threaded portion, a sleeve on the second portion of the shank, a collar around the sleeve and movable to a position around the first portion of the shank, the collar including a means for attachment to a workpiece, and a retainer means for prohibiting movement of the collar off of the sleeve in one direction. The smaller outer end of the shank is adapted to enter a clearance opening in a part for engagement with a floating nut at the opposite end of the opening, while the larger portion of the shank is drawn into the opening and the fastener is tightened. The smaller portion of the shank permits the fastener to be mated when the openings are misaligned while the larger portion of the shank provides shear resistance when the fastener is mated. An enlarged end thread portion retains the sleeve on the shank and fits in an internal groove in the sleeve to hold the bolt in its retracted position.

27 Claims, 8 Drawing Figures

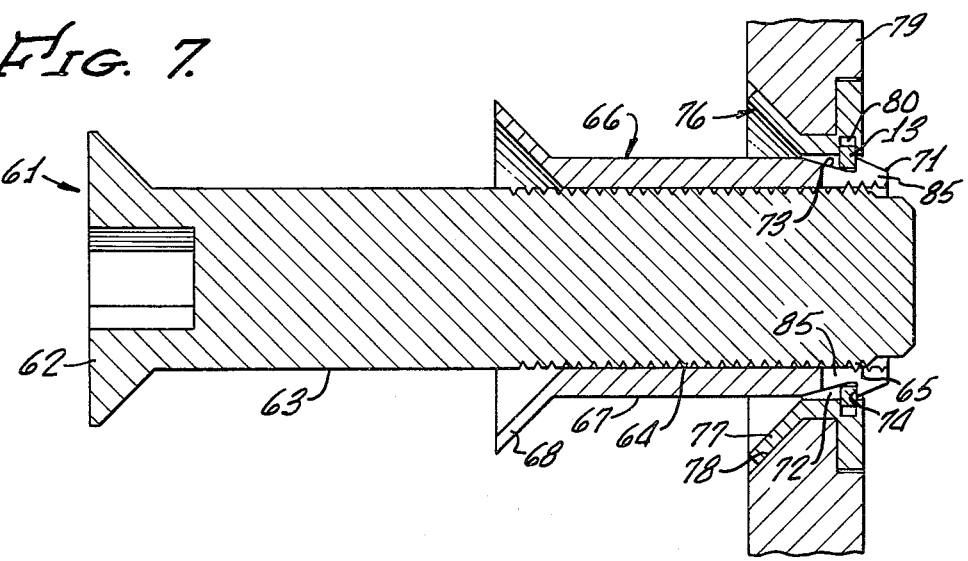
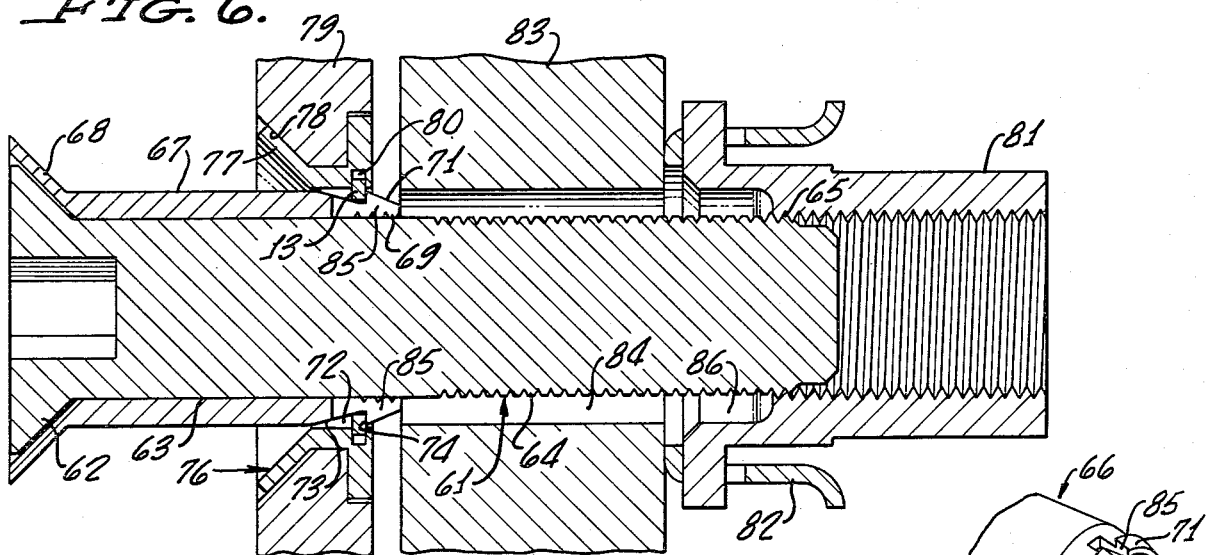
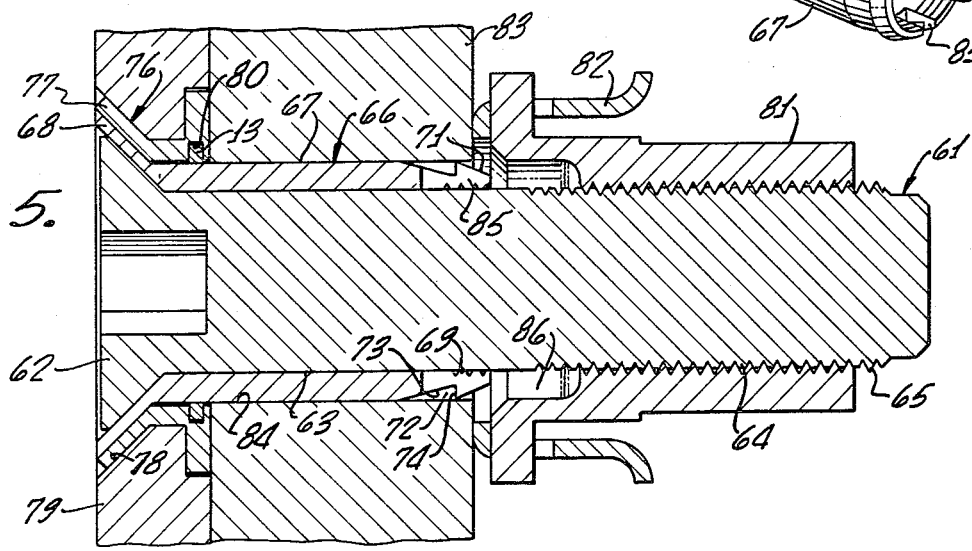

STRESSED PANEL FASTENER

This is a continuation-in-part application of Ser. No. 236,859, filed Feb. 23, 1981, now abandoned.

BACKGROUND OF THE INVENTION

Especially in the aerospace industry, there is a requirement for fasteners with certain characteristics that make them suitable for securing removable panels. This type of panel is attached to a supporting structure by a number of fasteners that frequently must have the capability of resisting shear loads. This is accomplished by a bolt shank that extends through an opening in the structure to mesh with a nut held to the opposite side. Because of the loading, the shank of the bolt portion of the fastener has been made relatively large in diameter so as to have a cross sectional area sufficient to enable the fastener to withstand the shear forces.

However, when the large threaded shank is pushed or pulled through a generally complementary opening in the supporting structure as the panel is installed or removed, there is a tendency for the shank to ream out the opening, especially when the support is made of relatively soft material such as aluminum. Obviously, this is undesirable and causes permanent damage. In addition, the large shank may catch on the wall of the opening when the panel is to be removed, making it difficult to separate the panel from the supporting structure. With the shank of the bolt being approximately as large in diameter as the opening through which it extends when the panel is secured, precise alignment with the opening is necessary for attachment of the panel. This adds to the time and the difficulty in securing the panel in place.

One form of extensively used panel fastener includes retainer ring that slides along the bolt shank and serves to retain the bolt to the panel. This retainer ring is exposed when the fastener is separated, leaving it vulnerable to damage or to being dislodged from the shank. This fastener also requires the formation of close tolerance grooves in the shank which must be produced by expensive EDM machining. This adds substantially to the cost of the completed fastener.

SUMMARY OF THE INVENTION

This invention provides a panel fastener suitable for aerospace use, providing high shear resistance when in the secured position and overcoming the problems outlined above. The fastener is readily engaged and tightened even when the panel is significantly misaligned with the opening in the supporting structure. The shank of the fastener is fully retractable when the fastener is loosened and it is held in its retracted position so the end is protected and will not interfere with movement of the panel away from the supporting structure. The fastener achieves these advantages while being also relatively simple, and easily and economically manufactured. No unusual or expensive manufacturing procedures are necessary.

The fastener includes a bolt having a head at one end and a shank projecting from it, the shank having a first portion of relatively large diameter adjacent the head and a second portion of smaller diameter outwardly from the first portion. The thread is on the second portion. The outer one or two turns of the thread are of normal height, but inwardly of that the thread is truncated so that it has a smaller major diameter than that of the outer turns. Received on the second portion of the shank is a sleeve which has an outside diameter corresponding to that of the first portion of the shank and a slotted expansible outer end with an internal annular groove. This permits the sleeve to slide relative to the shank and to expand so that the outer turns of the shank can fit within the internal groove. Nevertheless, the sleeve is prohibited from leaving the shank by reason of the remainder of the sleeve which is not slotted or expansible.

In another version, the bolt shank is of constant diameter except for the full sized end threads, and the sleeve is made longer and without slots. Instead, an axially short thread in the forward end of the sleeve can mesh with the full sized end thread of the bolt shank to hold the bolt in its retracted position.

A collar fits around the sleeve, having a flange for engaging one side of a workpiece while the opposite end can be bent outwardly to form a cooperating flange to hold the collar to a workpiece such as a panel. A retainer ring fits in the annular groove in the collar and may enter an external annular groove in the sleeve. Being buried within the groove of the collar and sleeve, the retainer ring is protected against becoming broken or dislodged. The retainer ring can be cammed out of the sleeve groove so that the collar can move onto the first portion of the shank when the fastener is mated.

The relatively small outer end part of the shank permits it to enter a clearance opening in a structure to which the panel is to be attached even when the opening is misaligned with the fastener. When tightened into a nut held by the structural member, the first portion of the shank enters the opening with which it is substantially complementary, thereby providing substantial shear resistance.

When the bolt is loosened, the small diameter shank end allows it to be drawn freely from the opening in the workpiece rather than catching on the surface of the opening to resist retraction. The small shank end also minimizes any tendency for the threaded shank to ream out the opening in a softer workpiece, such as one of aluminum, thereby preventing damage to the workpiece.

BRIEF DECRIPTION OF THE DRAWINGS

FIG. 5 is a cross sectional view of a modified form of the fastener in the mated position;

FIG. 6 is a cross sectional view of the embodiment of FIG. 5 in the retracted position;

FIG. 7 is a cross sectional view of the fastener of the embodiment of FIG. 5 as mating of the fastener is initiated; and FIG. 8 is a fragmentary perspective view of the sleeve of the fastener assembly.

DETAILED DESCRIPTION OF THE PREFERRED EMBODIMENT

Figure 1:
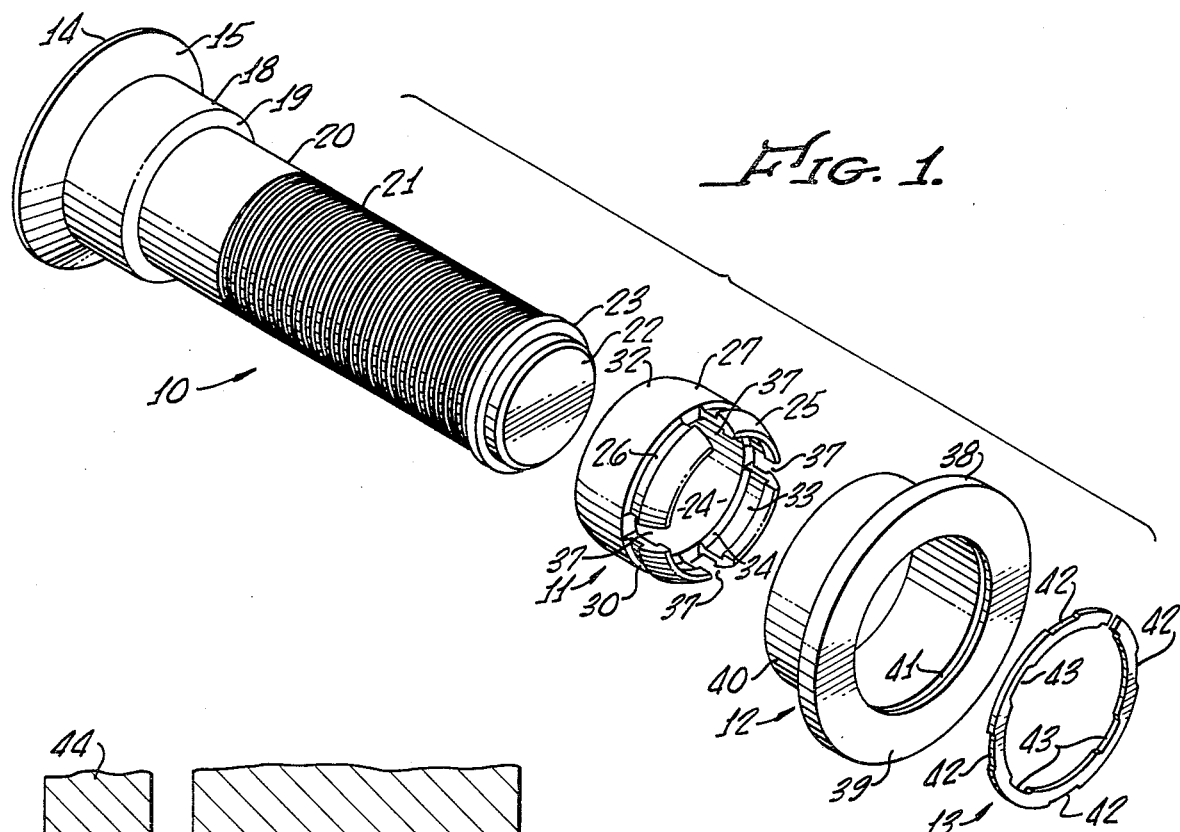
FIG. 1 is an exploded perspective view of the fastener of this invention.

The fastener illustrated in FIGS. 1 through 4 includes a bolt 10, a sleeve 11, collar 12, and a retainer ring 13. At one end of the bolt 10 is a head 14 with a frustoconical undersurface 15. A driving recess 16 extends inwardly from the outer radial surface 17 of the head. The shank of the screw projects outwardly from the head 14 and includes a cylindrical portion 18, which is relatively short and of relatively large diameter, immediately adjacent the head. A convexly rounded shoulder 19 connects the shank portion 18 with a longer shank section 20. The portion of the shank section 20 adjacent the shoulder 19 has a cylindrical surface, with a thread 21 being formed on most of the remainder of this section of the shank. The thread 21 is truncated as compared with a standard thread by being reduced in height so as to have a slightly smaller than normal major diameter. At the outer part of the shank, adjacent its end 22, is a thread 23 which is of normal diameter and hence of greater major diameter than the thread 21. The thread 23 forms a continuation of the thread 21 and is short, extending for only one or two turns.

The sleeve 11 fits on the longer shank portion 20 between the end thread 21 and the shoulder 19. The inner cylindrical surface 24 of the sleeve 11 has a diameter slightly larger than the major diameter of the thread 21, but smaller than the major diameter of the thread 23. Hence, the sleeve 11 is retained on the shank, but is movable axially relative to it between the shoulder 19 and the end thread 23. The thread may be formed after the sleeve 11 is fitted on the shank section 17, being rolled so that the end thread 23 can be made larger than the inside diameter of the sleeve.

The forward corner 25 of the sleeve 11 is convexly rounded. Rearwardly of this is an external annular groove 26, beyond which is a cylindrical outer surface 27. The latter surface has the same diameter as the shank portion 18. The annular groove 26 includes a radial forward end wall 28, a cylindrical bottom wall 29, and a tapered rearward end wall 30 that flares outwardly from the bottom wall 29 to the cylindrical surface 27. Adjacent the rearward end 31, the sleeve 11 has a rearwardly tapering exterior surface 32.

Interiorly, the sleeve 11 includes an annular groove 33 inwardly a short distance from the forward end of the sleeve. The groove 33 terminates at the same rearward location as that of the outer groove with a tapered surface 34. The internal groove 33 is longer axially of the sleeve than is the outer groove 26, so that its forward terminus at a radial wall 35 is forward of that of the outer groove. The bottom wall 36 of the groove 33 is cylindrical.

Four equally spaced slots 37 extend axially inwardly of the sleeve from the forward edge 24. The inner ends of the slots 35 are at the same location as the inner ends of the annular recesses 26 and 33. This construction provides the forward end of the sleeve 11 with flexibility due to the presence of the axial slots 37 and the reduced wall thickness at the annular grooves 26 and 33.

The collar 12 includes an external radial flange 38 at one end 39 of the collar, with the remainder 40 of the length of the collar initially being of cylindrical shape. The inside diameter of the collar 12 is larger than the outside diameter of both the sleeve 11 and the shank portion 18. Internally, at the location of the radial flange 38, the collar includes an annular groove 41. This is adapted to receive the outer portions of the retainer ring 13 and is deep enough to permit most of the retainer ring to be expanded into it.

The retainer ring 13 is split and has four shallow notches 42 in its exterior circumferential surface. In the interior circumferential surface are four similar shallow notches 43, which are staggered in position relative to the notches 42. The free diameter of the retainer ring 13 is smaller than that of the inside surface 29 of the annular recess 26 of the sleeve 11.

In use of the fastener, the collar 12 holds the assembly to a workpiece, such as a panel 44. The cylindrical portion 40 of the collar is fitted through a cylindrical opening 45 in the panel 44. After this occurs the outer end of the cylindrical portion 40 of the collar 12 is flared outwardly to form a flange 46 that overlies the surface of a countersink 47 in the panel 44 that forms a continuation of the opening 45.

Figure 2:
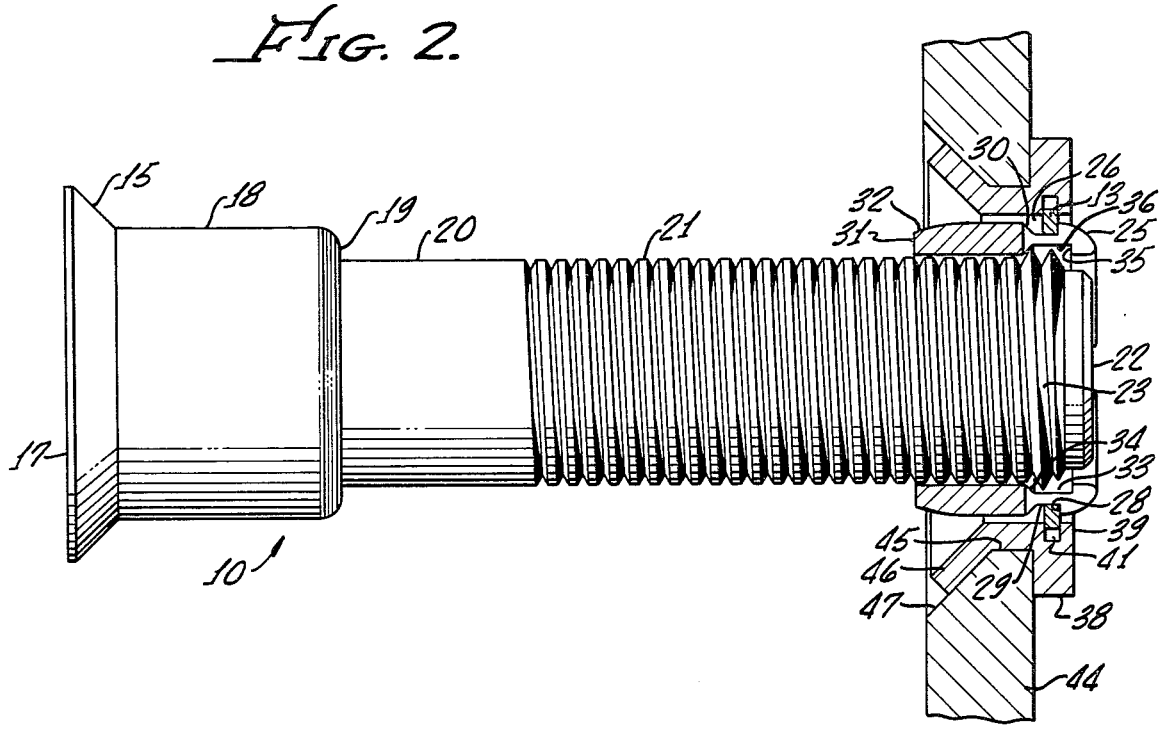
FIG. 2 is a side elevational view partially in section of the fastener attached to a panel and in a retracted position.

By this arrangement, the bolt 10 is held to the panel 44 with freedom for limited axial movement. As the fastener is seen in FIG. 2, with the retainer ring 13 in the annular groove 26 of sleeve 11, the screw 10 is at the leftward end of its permitted axial travel. This is because the full size end thread 23 is adjacent the shoulder 34 at the inner end of the internal groove 33 of the sleeve 11. Inasmuch as the major diameter of the end thread 23 is greater than the inside diameter of the sleeve 11 at the internal surface 24, the shank of the screw cannot be pulled out of the sleeve to the left. The sleeve 11, in turn, cannot move axially to the left because of the presence of the retainer ring 13 in both the external groove 26 and the sleeve 11 and the annular groove 41 of the collar 12.

The bolt 10 can move axially the other direction, to the right as illustrated, as the sleeve 11 slides over the thread 18 and the unthreaded portion of the shank 20. At the beginning of this movement, the end thread 23 engages the forward shoulder 35 of the internal groove 33 of the sleeve 11, deflecting the split forward end of the sleeve outwardly so that it can pass over the end thread 23. Continued movement of the screw relative to the other components of the assembly causes the rearward end 31 of the sleeve 11 to strike the shoulder 19 of the bolt 10. Additional movement of the bolt 10 to the right then causes the retainer ring 13 to be cammed outwardly by the inclined inner edge surface 30 of the external annular groove 26 of the sleeve 11 so that the retainer ring slides over the outer surface 27 of the sleeve and onto the enlarged portion 18 of the shank. The tapered shoulder 19 of the shank and tapered rearward outer surface 32 of the sleeve 11 assure that the retainer ring 13 can slide freely between the sleeve and the enlarged portion 18 of the shank. Relative movement of the collar 12 and the bolt 10 then is terminated by the engagement of the outwardly flared flange 46 of the collar with the undersurface 12 of the head 11 of the bolt.

Figure 4:
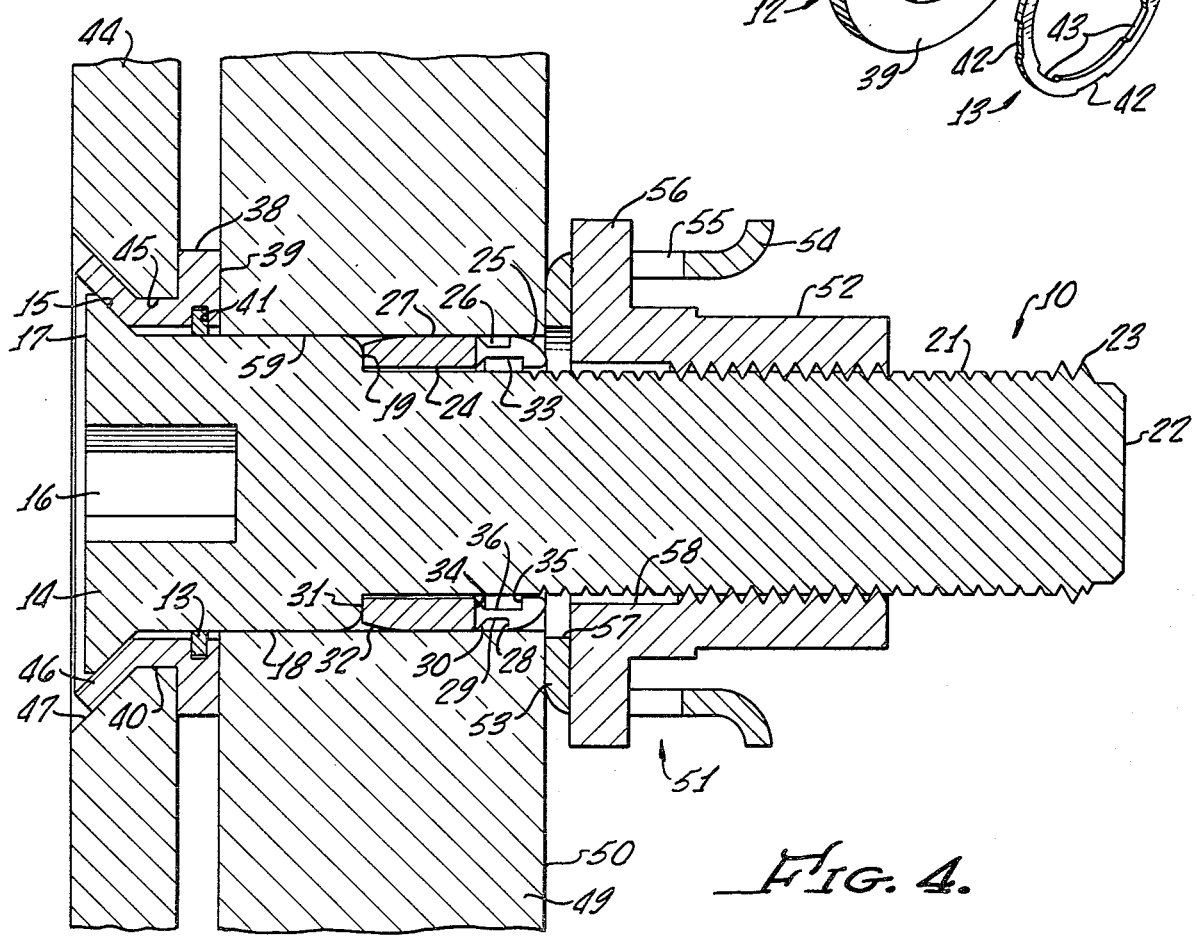
FIG. 4 is a cross sectional view similar to FIG. 3 but with the fastener fully mated in the secured position.
Figure 3:
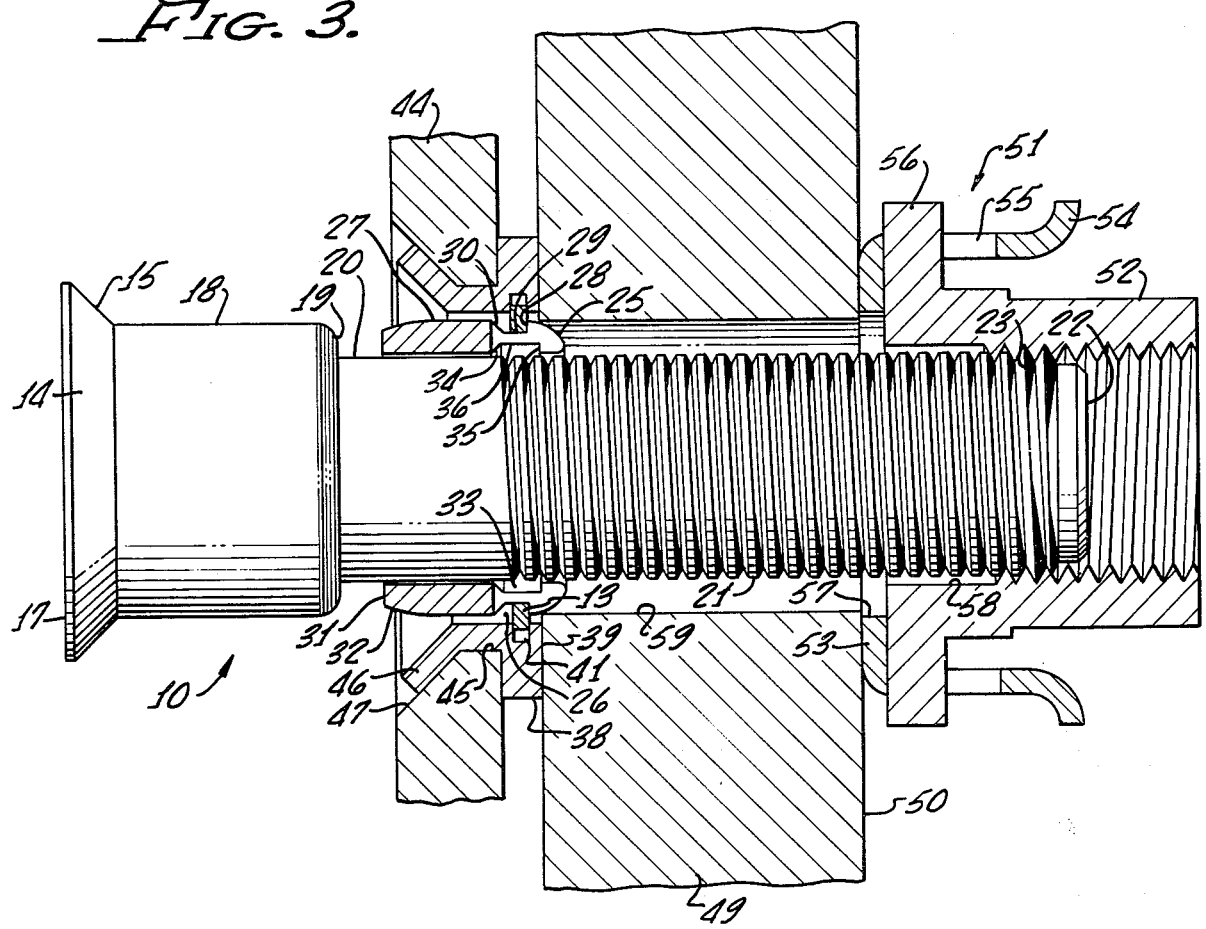
FIG. 3 is a cross sectional view of the fastener partially engaged with a nut to hold the panel to a supporting structure.

The fastener typically is used in securing the panel 44 to a supporting structural member 49 on one side 50 of which is mounted a nut assembly 51 seen in FIGS. 3 and 4. The latter may be of the type shown in patent 2,243,923, including a nut 52 held by a cage 53 which is fastened to the member 49 by means of rivets or screws, not shown. The cage 53 includes upwardly bent flanges 54 on opposite sides, these having slots 55 that receive tabs 56 projecting from the base of the nut 52. There is a clearance between the walls of the slots 55 and the tabs 56 so that the nut 52 is permitted limited floating movement laterally relative to the cage 53. A central opening 57 in the cage 53 provides access to the threaded bore 58 of the nut 52. A larger opening 59 extends through the member 49.

As the connection is made, the bolt 10 is pushed axially to extend through the opening 59 and enter the threaded bore 58 of the nut 52. Thereafter, rotation of the screw advances the shank into the nut. Initially, the sleeve 11 remains outside of the opening 59, held by the retainer ring 13. Ultimately, the shoulder 19 of the screw at the end of the enlarged shank portion 20 engages the end 31 of the sleeve 11, which causes the sleeve 11 to move with the bolt 10. Thereafter, the retainer ring 13 is cammed out of the external annular recess 26 and slides along the outer surface 27 of the sleeve 11 as the sleeve is pushed into the opening 59 by the shoulder 19. Then, the enlarged shank portion 18 enters the opening 59 and the retainer ring 13 moves along the surface of the shank portion 18 until the undersurface 15 of the head 14 bottoms against the flange 46 of the collar 12. This is the fully mated position of FIG. 4.

Subsequently, upon loosening of the fastener, it can be pulled to a fully retracted position relative to the panel 44 as the panel is separated from the member 49, as shown in FIG. 2. When the bolt 10 is pulled outwardly (to the left as shown), the end thread 23 of the bolt is brought into engagement with the forward end of the sleeve 11. The inclined flank of the thread 23 produces a reaction that deflects the slotted forward sleeve end outwardly so that the end thread 23 can enter the internal groove 33. The major diameter of the thread 23 is less than the inside diameter of the groove 33 at its surface 36, so that the slotted forward end of the sleeve then snaps back to its normal position, as seen in FIG. 2. The sleeve 11 then holds the bolt 10 in the fully retracted position where its shank end does not project from the forward end of the sleeve. This means that the shank of the bolt is protected and that it will not interfere with movement of the panel 44 away from the support 49, including lateral movement of the panel. This positioning of the bolt 10 also maintains it in readiness for later attachment to the nut 52 and facilitates the entry of the shank portion 20 into the opening 59 in the support 49.

When the fastener is mated as in FIG. 4, the enlarged portion 18 of the shank of the bolt 10 enters the opening 59 in the member 49. The rounded corner at the shoulder 19 facilitates entry of the shank portion 18 into the opening 59. There is a relatively close fit between the shank portion 18 and the wall of the opening 59, so that shear forces are taken out through the enlarged shank portion 18 which has maximum shear resistance.

Nevertheless, the fastener can be used in instances where there is substantial misalignment between the panel 44 and the member 49. This is because the elongated portion 20 of the shank of the bolt 10 has a relatively small diameter so that it is able to enter the opening 59 even though it is not aligned with the axis of the opening 59. The screw can even be tilted relative to the collar 12, and hence the panel 44, by virtue of the clearance between the sleeve 11 and the interior of the collar. It is possible for the shank to engage the threads of the nut 52 in misaligned conditions because the nut is of the floating type and so can be shifted to whatever position is necessary for receiving the shank.

The embodiment of FIGS. 5–8 is simplified and more economically manufactured than that of FIGS. 1–4. The shank of the bolt 61 of this version of the fastener is of constant diameter from its head 62 along the unthreaded portion 63, this being the same as the major diameter of the truncated length 64 of the thread. The outermost one or two turns 65 are full sized and therefore of a greater major diameter than the truncated part of the thread.

Around the bolt shank is a sleeve 66, most of the length 67 of which is cylindrical. At its rearward end, however, is an outwardly flared flange or head 68 which can be complementarily engaged by the undersurface of the head 62 of the bolt 61. At the forward end, a short shallow thread 69 is formed on the inner surface of the sleeve. Exteriorly, the forward end of the sleeve is tapered inwardly toward the axis along the surface 71. Immediately to the rear of this surface is an external annular groove 72. The rearward surface 73 of this groove is more shallowly inclined than its forward surface 74. The inner surface of the sleeve 66 is generally complementary to the shank of bolt 61, along which it can slide. The inside diameter of the sleeve 66 is large enough to permit such sliding but is less than the major diameter of the end turns 65.

The collar 76 is similar to the collar 12, but may be made thinner along its end where the flange 77 is flared outwardly. This is because the flange 77 is engaged by the outwardly flared end 68 of the sleeve 66, which adds to the thickness of the material of the fastener present at the countersink 78 in the panel 79 to which the assembly is attached. An internal groove 80 in the collar 76 receives the retainer ring 13.

In the mated position of FIG. 5, the threaded end 64 of the shank is received in a nut 81 which is held by a basket 82 that is secured to a structural member 83. The head 62 of the bolt bears against the outwardly flared end 68 of the sleeve 66, which in turn engages the flange 77 of the collar 76. The cylindrical part 67 of the sleeve 66 extends through the collar 76 and fits within the opening 84 in the member 83.

When the fastener is loosened, the threaded end of the bolt shank disengages the nut 81 and the portion of the shank with the truncated thread 64 slides through the interior of the sleeve 66. When the bolt is free from the nut it may be pulled axially to bring the full sized thread 65 into engagement with the end of the sleeve 66. This part of the thread cannot slide through the sleeve, being larger in major diameter than the inside diameter of the sleeve. Therefore, the thread 65 acts as an abutment and the axial pull on the bolt 61 causes the sleeve to be moved with the bolt so that the head 68 of the sleeve is spaced above the panel 79. This brings the groove 72 to the position of the retainer ring 13, which then enters the groove to hold the sleeve 66 in its retracted position. At this time the sleeve may be manually held and the bolt 61 rotated slightly to cause the full sized end thread 65 to mesh with the internal thread 69 of the sleeve. This causes the bolt 61 to be held in a fully retracted position.

When the fastener is to be returned to the mated position, the sleeve 66 may be held while the bolt 61 is rotated, disengaging the bolt thread 65 from the sleeve thread 69. The bolt 61 then is pressed inwardly so that its shank passes through the opening 84 in the member 83 to reach the nut 81. This enables the shank to mesh with the nut while the panel 79 is still spaced from the member 83 and the sleeve 66 has not yet attempted to enter the opening 84. As a result, the bolt shank has considerable clearance around it when it travels through the opening 84, and can mesh with the nut 81 even though there may be misalignment of the parts. Later the bolt head 62 reaches the sleeve head 68, providing an abutment that causes the sleeve to move axially with the bolt. As the sleeve 66 moves into the opening 84, it acts as a dowel that brings the parts into exact alignment. The rounded and tapered forward end surface 71 of the sleeve facilitates its entry into the opening 84 when there is initial misalignment.

The cylindrical part 67 of the sleeve 66 fits snugly in the opening 84, augmenting the shear strength of the bolt shank. Again, therefore, the bolt can mesh with the nut despite misalignment and will not damage the part through which it extends, yet the mated fastener provides high shear resistance.

Two diametrically opposed slots 85 extend inwardly from the forward end of the sleeve 66 and intersect the external annular groove 72. This is to permit removal of the sleeve 66 and bolt 61 from the collar 76, which may be needed such as when the bolt threads have become damaged or the bolt is of improper length. The removal is accomplished by inserting a small tool, such as a length of wire, into the slot 85 to pry the retainer ring 13 out of the groove 72 in the sleeve 66 and further into the groove 80 in the collar 76. The sleeve 66, and with it the bolt 61, then may be pulled free of the collar 76.

In the embodiment of FIGS. 1–4, the slots 37 may be used in the same manner as the slots 85 for sleeve and bolt removal.

In the embodiment of FIGS. 5–8, the nut 81 has an enlarged counterbore 86 in the end that the bolt enters. This can receive the end of the sleeve 67 in the event that the panel is to be secured to a supporting structure somewhat thinner than the member 83.

The foregoing detailed description is to be clearly understood as given by way of illustration and example only, the spirit and scope of this invention being limited solely by the appended claims.

What is claimed is:

1. A fastener comprising
a member having
a head at one end, and
a shank projecting from said head,
said shank including a first portion of relatively large outside diameter adjacent said head,
and a second portion of relatively small diameter remote from said head, said second portion having a thread thereon,
a sleeve having an inside diameter greater than that of said second portion of said shank and less than that of said first portion of said shank,
said sleeve being received on said second portion of said shank and being axially movable relative thereto,
a collar circumscribing said shank,
said collar including means for attachment to a workpiece,
said collar having an inside diameter greater than that of the outside diameter of said sleeve and the outside diameter of said second portion of said shank, whereby said collar can move relative to said shank and to said sleeve so that either said second portion of said shank or said sleeve is received in said collar,
and retainer means for limiting said relative movement so that said collar cannot move off of said sleeve in the direction of the outer end of said shank, and cannot move off of said first portion of said shank in the direction of said head.

2. A device as recited in claim 1 in which the outside diameter of said sleeve is substantially the same as the diameter of said first portion of said shank.

3. A device as recited in claim 1 in which said shank defines a shoulder between said first and second portions thereof, said shoulder being engageable by said sleeve for limiting the movement of said sleeve relative to said shank in the direction of said head.

4. A device as recited in claim 3 in which said shoulder tapers toward the outer end of said shank.

5. A device as recited in claim 3 including means for limiting the movement of said sleeve relative to shank in the direction of the outer end of said shank.

6. A device as recited in claim 5 in which said second portion of said shank is longer than said first portion of said shank.

7. A device as recited in claim 1 in which
said thread has a first portion having a first major diameter adjacent the outer end of said shank, and a second portion having a second major diameter inwardly thereof,
said first major diameter being greater than the inside diameter of said sleeve,
whereby said sleeve can be moved relative to said shank inwardly of said outer end of said shank.

8. A device as recited in claim 7 in which said second portion of said thread is longer than said first portion of said thread.

9. A device as recited in claim 8 in which said first portion of said thread extends for no more than two turns.

10. A device as recited in claim 8 in which said sleeve at the end portion thereof adjacent the outer end of said shank has slot means therein for providing said end of said sleeve with resilience to permit expansion thereof and the entry of said first portion of said thread into said end portion of said sleeve.

11. A device as recited in claim 10 in which said sleeve inwardly of said end thereof includes an internal annular groove for receiving said first portion of said thread upon entry of said first portion of said thread into said outer end portion of said sleeve, whereby said sleeve can return to its free diameter upon such entry of said first portion of said thread therein.

12. A device as recited in claim 11 in which the length of said first portion of said thread relative to the length of said sleeve between said inner annular groove and said outer end thereof is such that when said first portion of said thread is so received in said internal annular groove, said outer end of said shank is entirely received within said sleeve.

13. A device as recited in claim 10 in which for said slot means said sleeve has axial slots extending inwardly from said outer end.

14. A device as recited in claim 12 in which
said retainer means includes a resilient element,
said collar having an internal annular groove receiving portions of said resilient element,
said sleeve having an exterior annular groove adapted to receive other portions of said resilient element,
said exterior annular groove being radially outwardly of said internal annular groove of said sleeve, whereby said sleeve has a relatively thin deflectable wall between said internal and exterior grooves thereof.

15. A device as recited in claim 1 in which said retainer means includes a split resilient ring, said collar having an internal annular groove receiving outside portions of said ring, said sleeve having an exterior annular groove receiving inside portions of said ring, said groove of said sleeve having a substantially radial wall adjacent one end thereof for retaining said ring and having an outwardly inclined wall at the opposite end thereof for permitting said ring to be expanded into said groove in said collar when forced out of said groove in said sleeve.

16. A fastener comprising
a member having
a head at one end, and
a shank projecting from said head,
said shank having a thread thereon, said thread adjacent the outer end of said shank having a first major diameter and inwardly of said outer end of said shank having a second major diameter less than said first major diameter,
a sleeve having an inside diameter greater than that of said second major diameter and less than that of said first major diameter, and having a first end relatively adjacent said head of said member and a second end relatively remote from said head of said member,
said shank being received in said sleeve, said shank and said sleeve being axially movable relative to each other between a first position in which said head of said member is relatively close to said first end of said sleeve and a second position in which said head of said member is relatively remote from said first end of said sleeve,
releasable means for holding said sleeve and said shank in said second position thereof,
a collar circumscribing said shank,
said collar including means for attachment to a workpiece, and having an inside diameter greater than that of the outside diameter of said sleeve, whereby said sleeve can be received in said collar, and said sleeve and said shank can move axially relative to said collar, said sleeve being so movable relative to said collar between a first position in which said second end thereof is relatively adjacent said collar, and a second position in which said second end thereof is relatively remote from said collar, and
releasable means for retaining said sleeve in said first position thereof relative to said collar.

17. A device as recited in claim 16 in which the outer surface of said sleeve tapers toward the outer end of said shank for facilitating entry of said sleeve into an opening in a workpiece.

18. A device as recited in claim 16 for said means for holding said sleeve and said shank in said second position thereof, said collar has a recess therein adapted to receive said portion of said thread adjacent the outer end of said shank, said sleeve including an expansible portion for permitting said portion of said thread adjacent the outer end of said shank to enter said recess.

19. A device as recited in claim 18 wherein said thread extends from a position spaced from said head to said outer end of said shank, said shank between said head and said thread having a first diameter adjacent said thread which is substantially equal to said second major diameter, and a second diameter larger than said first diameter adjacent said head, thereby defining a shoulder between said first and second diameters of said shank, said inside diameter of said sleeve being less than said second diameter of said shank, said shoulder being engageable with said first end of said sleeve for moving said sleeve with said member.

20. A device as recited in claim 16 in which for said means for holding said sleeve and said shank in said second position said sleeve includes an internal thread engageable by said thread adjacent the outer end of said shank, but not engageable by said thread inwardly of said outer end of said shank.

21. A device as recited in claim 20 wherein said internal thread extends for less than the full length of said sleeve, and is located adjacent said second end of said sleeve.

22. A device as recited in claim 16 wherein said thread extends from a position spaced from said head to said outer end of said shank, said shank between said thread and said head being of constant diameter substantially equal to said second major diameter.

23. A device as recited in claim 22 wherein said sleeve has a head at said first end thereof engageable by said head of said member for moving said sleeve with said member.

24. A device as recited in claim 16 wherein said thread inwardly of said outer end of said shank is larger than said thread adjacent the outer end of said shank.

25. A device as recited in claim 16 wherein said thread adjaceant the outer end of said shank extends for no more than two turns.

26. A device as recited in claim 16 wherein said releasable means for retaining said sleeve in said first position thereof relative to said collar includes a resilient element, said collar having an internal annular groove receiving portions of said resilient element, said sleeve having an exterior annular groove adapted to receive other portions of said resilient element.

27. A device as recited in claim 26 in which said sleeve includes slot means extending inwardly from said second end thereof and intersecting said exterior annular groove, for permitting a member to enter said slot means and force said resilient element out of said exterior annular groove and further into said internal annular groove of said collar so that said sleeve can be separated from said collar.

* * * * *